United States Patent [19]

Price

[11] Patent Number: 4,988,015
[45] Date of Patent: Jan. 29, 1991

[54] METHOD FOR DISPENSING FLUID MATERIALS

[75] Inventor: Richard P. Price, Parma Heights, Ohio

[73] Assignee: Nordson Corporation, Westlake, Ohio

[21] Appl. No.: 490,827

[22] Filed: Mar. 8, 1990

Related U.S. Application Data

[60] Division of Ser. No. 243,238, Sep. 7, 1988, Pat. No. 4,922,852, which is a continuation of Ser. No. 924,920, Oct. 23, 1986, abandoned.

[51] Int. Cl.$^5$ .............................................. G01F 1/34
[52] U.S. Cl. ...................................... 222/1; 222/504; 118/684
[58] Field of Search ................... 222/1, 52, 55, 59, 61, 222/63, 71, 504; 118/323, 410, 679, 683, 684, 692; 239/63

[56] References Cited

U.S. PATENT DOCUMENTS

| | | | |
|---|---|---|---|
| 2,851,997 | 9/1958 | DeMott et al. | 121/46.5 |
| 3,015,768 | 1/1962 | Hornfeck et al. | 318/28 |
| 3,410,301 | 11/1968 | Merriner et al. | 137/269 |
| 3,434,690 | 3/1969 | Troncale, Sr. | 251/30 |
| 3,464,627 | 9/1969 | Huber | 239/96 |
| 3,555,970 | 1/1971 | Borgeson et al. | 91/461 |
| 3,643,699 | 2/1972 | Mason | 137/625.64 |
| 3,666,141 | 5/1972 | Ma et al. | 222/1 |
| 3,757,823 | 9/1973 | Knutson | 137/625.64 |
| 3,779,426 | 12/1973 | Mawby | 222/146 |
| 3,817,150 | 6/1974 | Cox | 91/186 |
| 3,827,603 | 8/1974 | Reighard et al. | 222/146.5 |
| 3,945,399 | 3/1976 | Tirelli | 137/529 |
| 3,961,608 | 6/1976 | Hertfelder | 123/119 A |
| 4,013,037 | 3/1977 | Warning, Sr. et al. | 118/2 |
| 4,066,188 | 1/1978 | Scholl et al. | 222/146.5 |
| 4,084,539 | 4/1978 | Schmidt | 118/8 |
| 4,133,511 | 1/1979 | Hartmann et al. | 251/133 |
| 4,164,001 | 8/1979 | Patnaude | 361/236 |

(List continued on next page.)

FOREIGN PATENT DOCUMENTS

| | | |
|---|---|---|
| 98719 | 1/1984 | European Pat. Off. |
| 163069 | 4/1985 | European Pat. Off. |
| 2327263 | 1/1974 | Fed. Rep. of Germany |
| 2924264 | 12/1980 | Fed. Rep. of Germany |
| 3109303 | 3/1982 | Fed. Rep. of Germany |
| 3143169 | 1/1983 | Fed. Rep. of Germany |
| 203236 | 10/1983 | German Democratic Rep. |
| 86/03855 | 7/1986 | Luxembourg |
| 1325091 | 8/1973 | United Kingdom |
| 2049228 | 12/1980 | United Kingdom |
| 2074240 | 10/1981 | United Kingdom |

OTHER PUBLICATIONS

Publication by J. F. Blackburn et al., "Fluid Power Control", The MIT Press & Wiley, 1960, pp. 401–432.
Technical Bulletin #141 by Moog, Inc., Controls Division, Jun., 1978, pp. 1–7.
Publication by Badger Meter, Inc. Research Control Valves, "The Small Valves for Small Flows", date unknown, pp. 1–8.
Brochure by ASEA Robotics, Inc., Industrial Robot System for Gluing and Sealing, date unknown.
Brochure by OMEGA Pressure and Strain Measurement Handbook, p. A-22.

Primary Examiner—Michael S. Huppert
Attorney, Agent, or Firm—Wood, Herron & Evans

[57] ABSTRACT

Fluid to be dispensed is delivered under pressure to a dispensing nozzle by way of an infinitely variable valve which is disposed in sufficiently close proximity to the nozzle that very little fluid pressure drop takes place in the region between the valve and the nozzle. A parameter correlated to the rate of flow of fluid discharged from the nozzle is sensed between the valve and the nozzle to generate a flow rate signal from which a control signal is derived by comparing the flow rate signal with a signal representing a desired rate of flow. Where the nozzle is to be moved relative a workpiece for dispensing fluid material thereon, the latter signal may be derived from a signal correlated to the speed of relative movement between the nozzle and the workpiece such as a tool speed signal from the robot.

6 Claims, 3 Drawing Sheets

U.S. PATENT DOCUMENTS

| | | | |
|---|---|---|---|
| 4,232,517 | 11/1980 | Sumiyoshi et al. | 60/276 |
| 4,301,944 | 11/1981 | Lestradet | 222/55 |
| 4,360,132 | 11/1982 | Vilagi et al. | 222/504 |
| 4,392,366 | 7/1983 | Godfrey | 68/205 R |
| 4,430,886 | 2/1984 | Rood | 73/37 |
| 4,431,690 | 2/1984 | Matt et al. | 118/683 X |
| 4,464,976 | 8/1984 | Tyler | 91/365 |
| 4,465,212 | 8/1984 | Boone | 222/504 |
| 4,472,967 | 9/1984 | Godfrey | 73/216 |
| 4,478,775 | 10/1984 | Endo et al. | 264/40.3 |
| 4,613,059 | 9/1986 | Merkel | 222/52 |
| 4,614,300 | 9/1986 | Falcoff | 239/71 |
| 4,662,540 | 5/1987 | Schroter | 222/55 |
| 4,667,852 | 5/1987 | Siemann | 222/54 |
| 4,678,100 | 7/1987 | Gelinas et al. | 222/52 |
| 4,700,205 | 10/1987 | Rich | 346/140 R |
| 4,711,379 | 12/1987 | Price | 222/504 |
| 4,724,864 | 2/1988 | Schwelm | 137/486 |
| 4,787,332 | 11/1988 | Geisel et al. | 118/692 |

1

METHOD FOR DISPENSING FLUID MATERIALS

FIELD OF THE INVENTION

The present invention relates to a system for dispensing fluids. More particularly, the invention relates to an apparatus and method for dispensing viscous fluid materials such as lubricants, sealants and adhesives onto a workpiece at a controlled rate of flow which can be adjusted to compensate for changes in the relative speed between the dispenser and the workpiece.

BACKGROUND OF THE DISCLOSURE

When dispensing viscous fluids such as certain lubricants, adhesives sealants and the like, it is often necessary to apply the material to the surface of a workpiece in a bead containing a desired amount of material per unit length. In high production processes or where the bead of material must be positioned with accuracy, robot arms are often used to apply the material by rapidly guiding a dispensing nozzle in a programmed pattern over the surface of the workpiece. Depending on the application, the fluid being dispensed may either be projected some distance from the nozzle in a high velocity stream or extruded from the nozzle at lower velocity with the nozzle located closer to the workpiece. In either case, the amount of material applied per unit of lineal distance along the bead will vary according to both the flow rate of material discharged from the dispensing nozzle and the speed of the nozzle with respect to the workpiece.

For example, in the automotive industry it is necessary to apply a uniform bead of sealant around the periphery of the inside surface of automobile doors before joining the inside panel to the door. Along long, straight portions of the pattern, a robot arm can move the nozzle quickly. However, where the desired bead pattern changes direction abruptly, such as around the corners of a door panel, the robot arm must be slowed down to achieve a required bead positioning accuracy. It can be appreciated that if the flow rate of the dispensed fluid material is held fixed, the amount of material in the applied bead will increase as the robot arm is decelerated to negotiate changes in direction and will decrease as the robot arm is accelerated.

In the prior art, one attempt to deal with this problem has been to apply a toolspeed signal emanating from the robot controller to a voltage-controlled D.C. motor drive to control the speed of a ball screw mechanism driving the plunger of a shot pump filled with fluid. The shot pump is connected to the dispensing nozzle on the robot arm by way of a length of flexible hose. The toolspeed signal applied to the D.C. drive varies with the speed of the nozzle relative to the workpiece. As the rate of travel of the shot pump plunger changes, so too does the flow rate from the nozzle. Thus, the rate at which fluid is dispensed is controlled in open-loop fashion according to the speed of the nozzle.

Such a system suffers a number of deficiencies. First, it is inherently slow to respond. Therefore, only limited control of bead size is possible. In addition to the delays associated with the response of the D.C. drive and mechanical system driving the plunger, the flexible hose connected between the shot pump and the nozzle carried by the robot arm introduces significant response lag into the system. With a hose only 10 feet long, and depending on supply pressure and the characteristics of the fluid being dispensed, it may take a second or more for a change in pressure at the shot pump to be reflected in a corresponding change in flow at the nozzle. Thus, very precise control of bead size is difficult particularly during rapid changes in the speed of the robot arm. In addition to these performance limitations, such systems have other practical disadvantages. The shot pump itself should be capable of holding at least as much material as required to be applied to an entire workpiece. Accordingly, the pump and its associated mechanical drive are too bulky and massive to be mounted on the robot arm with the dispensing nozzle. The mechanical components and D.C. drive controls together may weigh up to several hundred pounds. Further, such a system is expensive to maintain and occupies a significant amount of production floor space.

Another type of system known in the prior art uses a more compact dispenser having a motor driven metering valve which receives a continuous supply of material by way of a flexible hose. The dispenser is mounted on the robot arm and includes a servomotor or stepper motor which controls the metering valve to adjust the flow in accordance with the speed of the dispensing nozzle as indicated by a toolspeed signal emanating from the robot. Closed-loop control of flow is effected by a feedback signal indicative of material flow deriving, at some point in the system remote from the dispensing nozzle. This feedback signal may be derived by sensing the displacement of the supply pump using an LVDT or potentiometer connected to the crosshead of the pump or by using a positive displacement flowmeter connected in line with the flexible hose which feeds the dispenser. In addition to this main control loop, such a system can incorporate a pressure sensor at the nozzle of the dispenser to shut off under specified conditions as described in European patent application No. 85-104,127.7. This reference discloses the use of one or more pressure sensors located in the wall of the dispensing nozzle to derive a pair of signals, one of which is used to indicate the presence of bubbles, the other of which indicates the flow of the liquid. The patent states that the latter signal can be derived for example from a pair of contacts connected to an elastic pressure-transmitting element which keeps the contacts closed as long as the pressure at the nozzle exceeds a certain value. In the event a clog develops in the flow channel, the flow signal can be used to initiate a shutdown of the system or provide an indication. Similar action can be taken should a bubble be sensed at the nozzle.

This type of system also has significant performance limitations. Even though the material being dispensed is metered by a dispenser mounted on the robot arm rather than from a remote metering device such as the shot pump system described above, the response time of the system is still relatively slow. As a consequence, the ability of the system to control bead size is limited, especially during rapid changes in the relative speed between the dispenser nozzle and the workpiece.

SUMMARY OF THE INVENTION

It is an objective of the invention to provide a system for dispensing viscous fluid materials having improved speed of response to permit more rapid and precise control of the flow of material being dispensed.

It is a further objective of the invention to provide such a dispensing system which is relatively compact and light weight as to be well suited for use with robots programmed to define a desired pattern according to which a bead of material is to be applied to a workpiece.

It is a further objective of the invention to provide a dispensing system capable of precisely controlling the amount of material applied to a workpiece per unit of lineal distance along a bead pattern despite rapid changes in the relative speed between the robot and the workpiece.

It is yet a further objective of the invention to provide such a fluid dispensing system which provides for linearizing the flow response of the system by accounting for the dynamic flow characteristics of the fluid as it is dispensed.

It is a still further objective of the invention to provide such a fluid dispensing system which periodically corrects for changes in the intrinsic viscosity of the fluid being dispensed in order to dispense a desired amount of material to each workpiece in a lot.

It is yet another object of the invention to provide an apparatus for dispensing fluids which provides for selectively locating the angular orientation of the fluid material supply hose to avoid interfering with free movement of the dispenser.

To these ends, a preferred embodiment of the invention includes a dispenser for viscous fluids having a servo actuator comprising an electro-pneumatic servovalve which operates a double-acting piston actuator. The servo actuator in turn drives a variable fluid metering valve. The dispenser includes a discharge nozzle located downstream of and in close proximity to the fluid metering valve. A pressure sensor disposed at the nozzle and downstream of the needle valve generates a pressure signal which is correlated to the instantaneous flow rate of the dispensed fluid.

Continuous precise control over flow is achieved utilizing the dispenser in a closed-loop control system whereby the electro-pneumatic servovalve is driven by a control current derived in accordance with the difference between the pressure signal and a driving signal representing a desired flow. In robotic applications, the driving signal is preferably related to a toolspeed signal emanating from the robot carrying the dispenser so that the control current will vary as required to maintain a uniform bead even during relatively rapid changes in the relative speed between the dispenser and the workpiece onto which material is dispensed.

Advantageously, such a system includes means for generating a "pressure overrange" signal when the pressure in the nozzle exceeds a predetermined value as may occur for example should the nozzle become clogged. Also provided are means for generating a "valve overrange" signal when the valve is fully opened and cannot open further. Such a signal is useful for determining that an insufficient amount of material may be being dispensed.

Another preferred embodiment of the invention includes an intelligent controller which monitors the amount of material being dispensed and compares it to a desired set point amount. If a deviation is sensed, the magnitude of the setpoint signal is periodically readjusted to zero out the difference, thereby compensating for changes in the intrinsic viscosity of the fluid. As used herein, the term "intrinsic" refers to changes in viscosity caused by phenomena other than shear effects. For example, intrinsic viscosity changes include variations due to temperature changes. Preferably, the intelligent controller is programmed to linearize the flow response of the dispenser to the toolspeed signal emanating from the robot thereby compensating for pressure flow non-linearities introduced by non-newtonian viscosity characteristics in the fluid being dispensed.

A preferred dispenser assembly includes a frame securable to a robot tool mounting face. One side of the frame supports the servo actuator while the opposite side carries the metering valve assembly which includes the pressure sensor. According to the invention, the metering valve assembly is secured to the frame in a rotatably adjustable manner so that the material supply hose may be routed to avoid interfering with free movement of the dispenser.

These and other advantages will be readily apparent from the following detailed description of a preferred embodiment of the invention and from the accompanying drawings wherein like reference numerals designate like items.

DETAILED DESCRIPTION OF THE INVENTION

Figure 1:
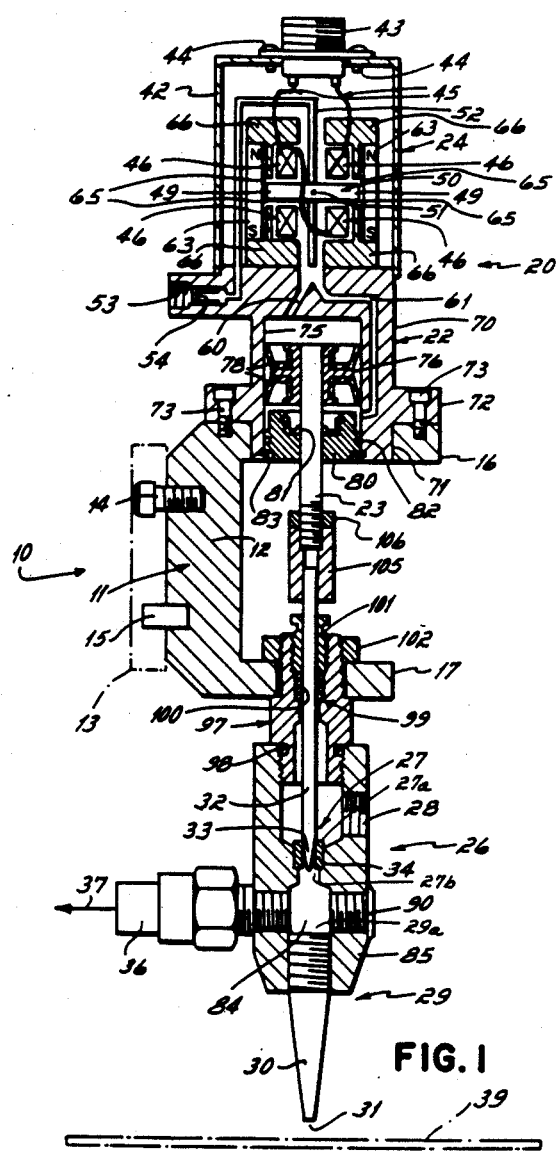
FIG. 1 is a schematic cross sectional view illustrating a preferred embodiment of a dispensing apparatus constructed according to the invention.

Referring now to FIG. 1 a preferred embodiment of a dispensing gun 10 constructed according to the invention is shown. Gun 10 includes a C-shaped frame 11 having a mounting plate 12 adapted to be secured to the tool mounting face 13 of a robot arm by means of one or more cap screws 14 and alignment pins 15. Frame 10 is preferably constructed of a rigid light weight material such as aluminum alloy and further includes, extending outwardly from mounting plate 12, an upper portion 16, and an opposed lower portion 17. The upper portion 16 of frame 11 carries a servo actuator 20 which may consist of any of a number of types of compact, light weight linear actuators offering rapid response. Preferably, actuator 20 comprises a double-acting air cylinder 22 having a piston rod 23 whose degree of extension is controlled by an electrically actuated pneumatic servovalve 24 disposed atop air cylinder 22. The lower portion 17 of frame 11 carries a metering valve assembly 26 having a needle valve 27 located between a fluid inlet 28 and a dispensing nozzle 29 which includes a nozzle end 30 having a nozzle inlet 29a and a nozzle outlet 31. Valve 27 includes a valve inlet 27a and a valve outlet 27b. For best control, needle valve 27 is located as close to nozzle 29 as practical and includes a valve stem 32 having a generally conical end 33 and a valve seat 34. Valve stem 32 is connected to piston rod 23 so that the position of its conical end 33 relative to valve seat 34 and hence, the flow rate of fluid discharged from nozzle 29 is controlled in accordance with the electrical input of electro-pneumatic servovalve 24. A transducer 36 located just downstream of needle valve 27 generates an electrical signal 37 correlated to the rate of flow of fluid discharged from nozzle 29. As will be described in further detail below, signal 37 is preferably used as a feedback signal to control the rate of flow of fluid dispensed from nozzle 29 in accordance with a desired driving signal. In robotic applications, the driving signal can vary with the relative speed between nozzle 29 and the workpiece 39 to accurately control the amount of fluid per unit length contained in the bead deposited on the surface of the workpiece 39.

Linear actuator 20 may incorporate any of a number of suitable types of fast responding electrically actuated servovalves including jet-pipe, nozzle and flapper or spool types. The details of the construction of actuator 20 are within the purview of those skilled in the art, and accordingly, do not constitute the claimed invention. In the preferred embodiment illustrated in FIG. 1, actuator 20 comprises a jet-pipe electro-pneumatic servovalve 24 which operates a double-acting air cylinder 22. Servovalve 24 includes a housing 42 which supports a threaded, electrical connector 43 secured thereto by screws 44. Wired to connector 43 by way of leads 45 are a pair of series-connected coils 46 surrounding opposing ends 49 of an armature 50 which is mounted to pivot about pivot point 51. A hollow, inverted U-shaped jet pipe 52 has one leg connectable to a regulated air supply of about 100 PSI nominal pressure through a threaded inlet 53 in air cylinder 22 by way of filter 54. The opposite leg of jet-pipe 52 is secured near its center to armature 50 so that when armature 50 is pivoted clockwise by energizing coils 46 in one polarity, the flow emanating from jet pipe 52 is diverted toward a first port 60. Similarly, when coils 46 are energized in the opposite polarity, armature 50 pivots counter-clockwise to direct the flow from jet pipe 52 toward a second port 61 of air cylinder 22. In either polarity, the degree of the deflection of jet pipe 52 and hence, the pressure in ports 60 and 61 is proportional to the magnitude of the current flowing in coils 46. Armature 50 is spring centered and magnetically biased such that when coils 46 are in a de-energized state, jet pipe 52 is centered in a neutral position as shown so that the pressures in ports 60 and 61 tend to be equally balanced. Magnetic bias is provided by a pair of permanent magnets 63 each of which communicate with the armature field by way of a flux across air gaps 65. This flux is conducted to gaps 65 by way of four magnetically permeable members 66 arranged as shown.

Double acting air cylinder 22 includes an aluminum alloy cylinder body 70, the end of which is received in a hole 71 in the upper portion 16 of frame 11. A flange 72 is used to secure the body 70 of air cylinder 22 to the upper portion 16 of frame 11 using cap screws 73. Cylinder body 70 includes first and second ports 60, 61, threaded air supply inlet 53 and filter 54 as well as a cylinder bore 75. Received within bore 75 is a piston 76 provided with a pair of seals 78 as well as piston rod 23 which extends axially from bore. The portion of bore 75 located above piston 76 communicates with first port 60 while the portion beneath piston 76 is connected to second port 61. The force with which piston 76 drives needle valve 27 depends upon the differential pressure between ports 60 and 61 which, as explained above, is determined by the deflection of jet pipe 50 due to the current flowing in coils 46. Piston is retained within cylinder bore 75 by a cap 80 through which passes piston rod 23. To prevent air leakage cap 80 is provided with a seal 81 in the area of piston rod 23 and an external O-ring seal 82 between the outer circumference of cap 80 and the surface of cylinder bore 75. Cap 80 is itself retained in the end of cylinder bore 75 by a snap-ring 83.

Metering valve assembly 26 includes a rigid, non-resilient valve body 85 constructed as shown in FIG. 1 preferably of metal. The lower end of valve body 85 includes a passage 84 whose lower end is threaded to accept the flow restricting nozzle 29 of a desired configuration having a discharge outlet 31. Passage 84 is intersected by one or more radial threaded holes, one of which receives transducer 36 and the others of which are sealed by means of plugs 90. Located immediately upstream of passage 84 and as closely adjacent thereto as practicable, valve body 85 houses needle valve 27. For long life, both valve stem 32 and valve seat 34 are preferably fabricated of a hard material such as sintered tungsten carbide. A fluid supply inlet 28 enters valve body 85 upstream of needle valve 27. Inlet 28 is threaded so that a hose can be attached to supply under pressure the fluid material to be dispensed.

Valve body 85 threads onto the lower end of a bonnet 97 and is sealed with respect thereto by means of an O-ring seal 98. Bonnet 97 includes an internal packing gland 99 which holds a plurality of annular PTFE packing seals 100. Seals 100 are retained in sealing but non-binding compression about valve stem 32 by means of any adjustable gland nut 101. To attach metering valve assembly 26 to frame 11, bonnet 97 is threadably received by the extending lower portion 17 of frame 11 and secured thereto at a desired angular orientation by means of a locknut 102. Metering valve assembly 26 is connected to actuator 20 by means of a coupling 105 which is fixedly attached to the upper end of valve stem 32 and threaded onto the lower end of piston rod 23 and held in place by a second locknut 106.

Transducer 36 may comprise any suitable transducer capable of generating a signal 37 indicative of the rate of flow of the fluid dispensed from nozzle 30. Preferably, transducer 36 is a strain gauge pressure transducer operably disposed to sense the instantaneous fluid pressure at a location inside passage 84 immediately downstream of needle valve 27. One pressure transducer suitable for this purpose is model A205 manufactured by Sensotec of Columbus, Ohio. The flow of a viscous newtonian fluid at low Reynolds numbers is substantially linearly proportional to the pressure drop across a nozzle or tubular restrictor placed in the flow path. It can be appreciated that a pressure transducer 36 located as described will sense the pressure drop across nozzle 29. This is so because the outlet 31 of nozzle 29 is at atmospheric pressure and there is very little pressure drop across passage 84 in relation to the pressure drop across nozzle 30. Thus, transducer 36 generates a pressure signal 37 which represents the instantaneous rate of flow from outlet 31. As previously noted, due to the proximity of needle valve 27 this flow is closely correlated to the flow through needle valve 27. Since flow rate is sensed by pressure transducer 37 and controlled by needle valve 27 both in close proximity to nozzle 29, precise control over flow rate, and hence, the amount of fluid per unit length deposited by gun 10 on workpiece 39 can be achieved by connecting dispensing gun 10 to form a fast responding closed-loop servo control system as described now with particular reference to FIG. 2.

Figure 2:
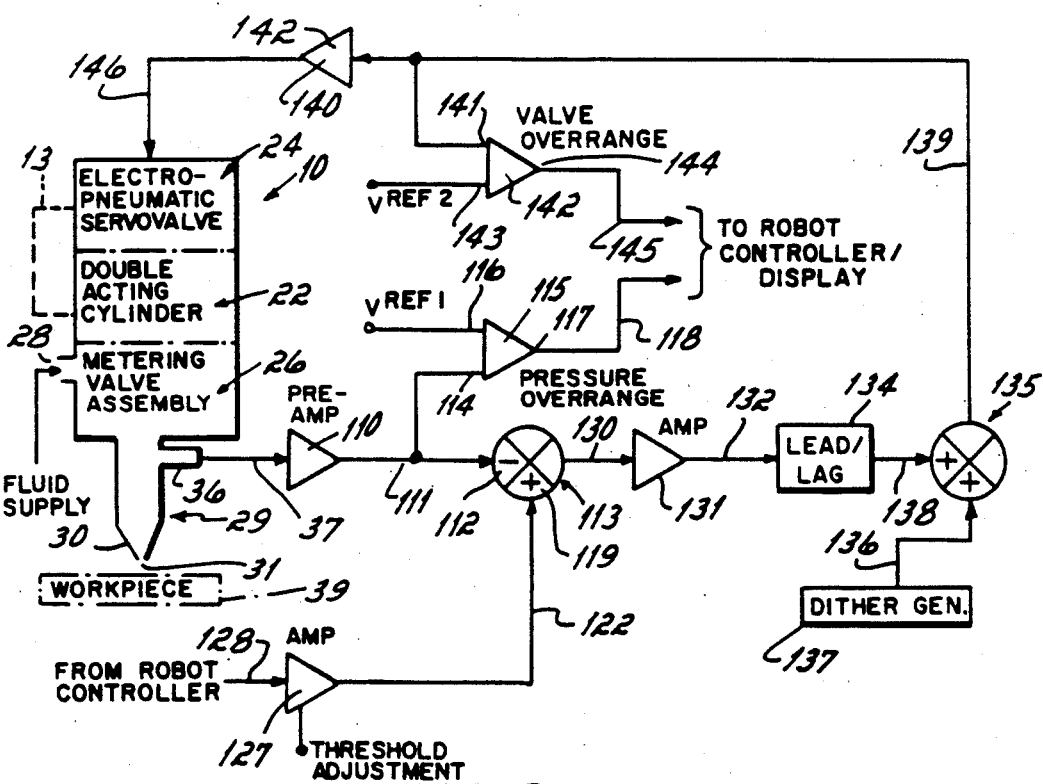
FIG. 2 is a block diagram illustrating a preferred embodiment of a system for dispensing fluid materials according to the invention.

Dispensing gun 10 is carried by the tool mounting surface 13 of a robot having a controller (not shown) programmed to guide nozzle 29 over the surface of a workpiece to dispense a bead of fluid thereon in a desired pattern. The metering valve assembly 26 of gun 10 communicates at its fluid inlet 28 with a continuous pressurized supply of fluid. Transducer 36 continuously senses the pressure drop across nozzle 29 to generate a pressure signal 37 correlated to the rate of flow of fluid discharged from the outlet 31 of nozzle end 30. Signal 37 is received and amplified by a preamp 110 which generates an output signal 111 appearing at the minus input 112 of a summing junction 113 as well as at a first input 114 of a comparator 115 whose second input 116 receives a fixed, selectable voltage reference, VREF1 and whose output 117 generates a digital PRESSURE OVERRANGE signal 118 which is received by the robot controller. If the magnitude of output signal 111 exceeds VREF1, digital PRESSURE OVERRANGE signal assumes a logical 1 value. This can occur for example if needle valve 27 opens too far. In such event, the robot controller can be programmed to present a fault indication, shut down the system or take other appropriate action. Summing junction 113 also includes a plus input 119 which receives a driving signal 122. In the embodiment of FIG. 2, driving signal 122 is generated by an amplifier 127 in accordance with a toolspeed signal 128 from the robot. Toolspeed signal 128 is an analog voltage signal available from the robot controller which varies according to the speed of travel of gun 10 relative to workpiece 39. Through the robot controller, the gain of signal 128 can be adjusted by way of a toolspeed multiplier selected to provide a desired flow rate as a function of speed of travel. Amplifier 127 is an operational amplifier whose gain is selected to properly scale toolspeed signal 128 so that driving voltage 122 will be within a range compatible with the rest of the circuit. Amplifier 127 is preferably connected as a precision limiter such that for inputs between zero volts and an adjustable threshold voltage, the voltage of driving signal executes a decisive step in a direction proper to close needle valve 27. Typically, the threshold voltage would be adjusted so that when toolspeed signal 128 is about 50 mV or less, needle valve 27 is driven positively closed. This prevents needle valve 27 from leaking by providing a negative bias current to servovalve 24, effective to drive needle valve 27 positively closed at times when toolspeed signal 128 is not present or quite small. Summing junction 113 produces an analog error signal 130 whose magnitude and polarity is equal to the algebraic difference between the output signal 111 of preamp 110 and driving signal 122. Error signal 130 is received by an amplifier 131 whose gain is adjusted for optimum system stiffness. The output signal 132 from amplifier 131 is received by a lead/lag compensation network 134 designed and adjusted according to standard control technique to stabilize closed-loop system response and maximize response speed with minimum overshoot. A second summing junction 135 then adds a dither signal 136 from a dither generator 137 to the output signal 138 of lead/lag network 134. Dither signal 136 is an A.C. signal whose magnitude preferably several percent of the fullscale value of signal 138. Dither signal 136 improves system resolution by overcoming static friction effects. Dither signal 136 accomplishes this by causing air cylinder 22 to oscillate very slightly during system operation, as is commonly practiced in the art. Summing junction 135 provides an analog voltage signal 139 whose magnitude and polarity is determined by the algebraic sum of signal 138 and dither signal 136. Signal 139 is received by a current driver 140 as well as by the first input 141 of a comparator 142 whose second input 143 receives a fixed, selectable voltage reference, VREF2 and whose output 144 generates a digital VALVE OVERRANGE SIGNAL 145. In the event the magnitude of signal 139 exceeds VREF2, digital VALVE OVERRANGE signal assumes a logical 1 state. Such a condition may arise for example if the supply of fluid to dispensing gun 10 is cutoff or if supply pressure is inadequate to meet the demand imposed by driving signal 122. Like PRESSURE OVERRANGE signal 118, VALVE OVERRANGE signal 145 is directed to the robot controller which may be programmed to generate a fault indication, shut the system down or otherwise initiate corrective action.

Current driver 140 generates an analog control current signal 146 which is applied to the coils 46 of servovalve 24. This causes jet pipe 52 to be diverted toward first port 60 or second port 61, depending on the magnitude and direction of control current signal 146, to move the piston 76 of air cylinder 22 either downward or upward, respectively. Downward movement of piston 76 tends to close needle valve 27 of metering valve assembly 26 thereby reducing the flow of fluid while upward movement of piston 76 tends to open needle valve 27 thereby increasing the flow of fluid.

In operation, the system functions as a closed loop servo system responsive to the pressure drop across nozzle 29 as sensed by pressure transducer 36. With needle valve 27 initially closed, no flow occurs and the pressure drop across nozzle 29 is zero. Assuming toolspeed signal 128 is less than the threshold voltage associated with amplifier 127, amplifier 127 generates a driving signal 122 of the proper polarity and of sufficient magnitude to generate a control current 146 to deflect jet pipe 52 toward first port 60. This holds piston 76 down so that needle valve 27 is held closed under force thereby preventing leakage. This condition is maintained until toolspeed signal 128 rises above the threshold voltage of amplifier 127 indicating that flow should commence. When this occurs, driving signal reverses polarity. Since there is initially no flow, pressure signal 137 is at its zero value. Accordingly, an error signal 130 whose magnitude is determined by the difference between pressure signal 37 and driving signal 122 will cause a control current 146 to be applied to coils 46 in such a polarity as to cause jet pipe 52 to deflect toward second port 61. In response, piston 76 moves upward causing needle valve 27 to open by lifting the conical end of valve stem 32 away from valve seat 34. As the pressure signal 37 generated by pressure transducer 36 increases error signal 130 and control current 146 both decrease and jet pipe 52 moves toward its null position. As the pressure drop across nozzle 29 approaches a value corresponding to a desired flow rate jet pipe 52 causes needle valve 52 to remain open by an amount just sufficient to maintain the pressure drop across nozzle 29 at that value.

In some dispensing applications, the flow characteristics of the fluid supplied to dispensing gun 10 may be subject to change over time. For example if gun 10 is supplied fluid from a drum, the viscosity of the fluid can vary with changes in temperature as the drum sits in a warm production area after having been moved from a cold warehouse. Viscosity may also vary from one drum of fluid to the next or from the top of a given drum to the bottom. Without some means for compensating for such changes, the amount of material dispensed onto a workpiece 39 would be subject to undesirable variations. Also, when dispensing non-newtonian fluids, the overall instantaneous viscosity of the fluid varies with shear rate in a non-linear fashion. Thus, absent correction, shear induced by the geometry of nozzle 29 will result in a non-linear flow rate versus pressure signal 37 flow characteristic. This in turn would render the flow rate versus applied toolspeed signal 128 response nonlinear. According to the invention, these problems are effectively addressed by deriving driving signal 122 in an alternate fashion as described now with additional reference to FIGS. 3 and 4.

Figure 3:
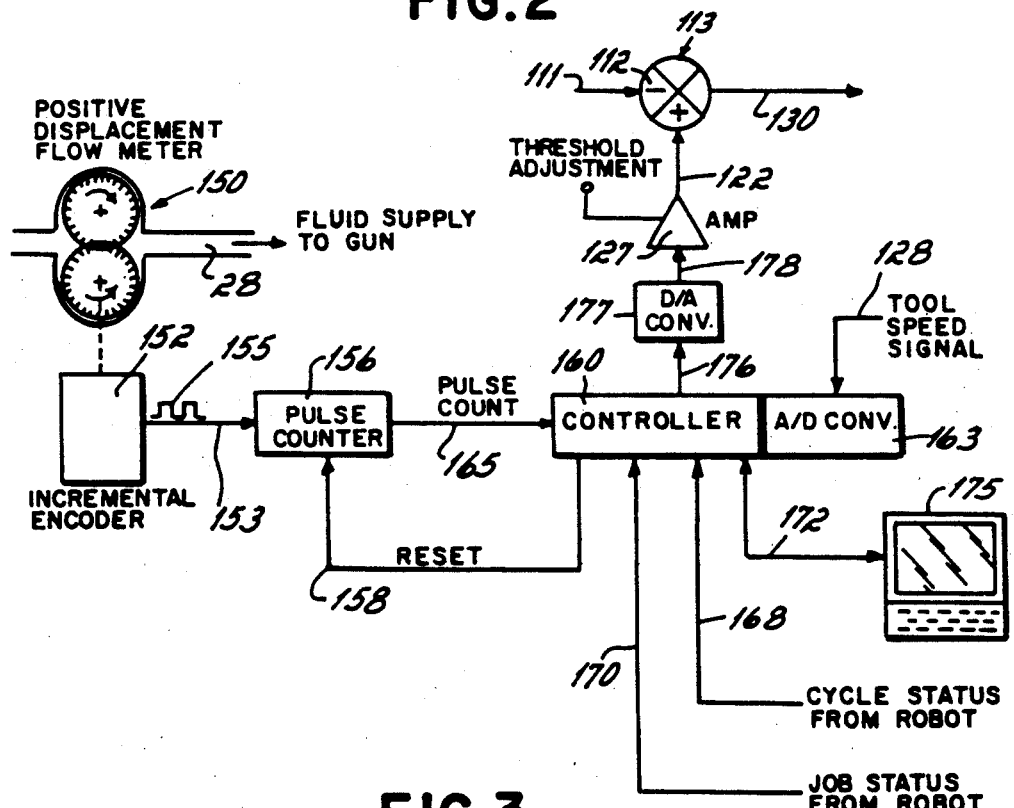
FIG. 3 is a block diagram illustrating a portion of a second preferred embodiment of a system for dispensing fluid materials according to the invention.
Figure 4:
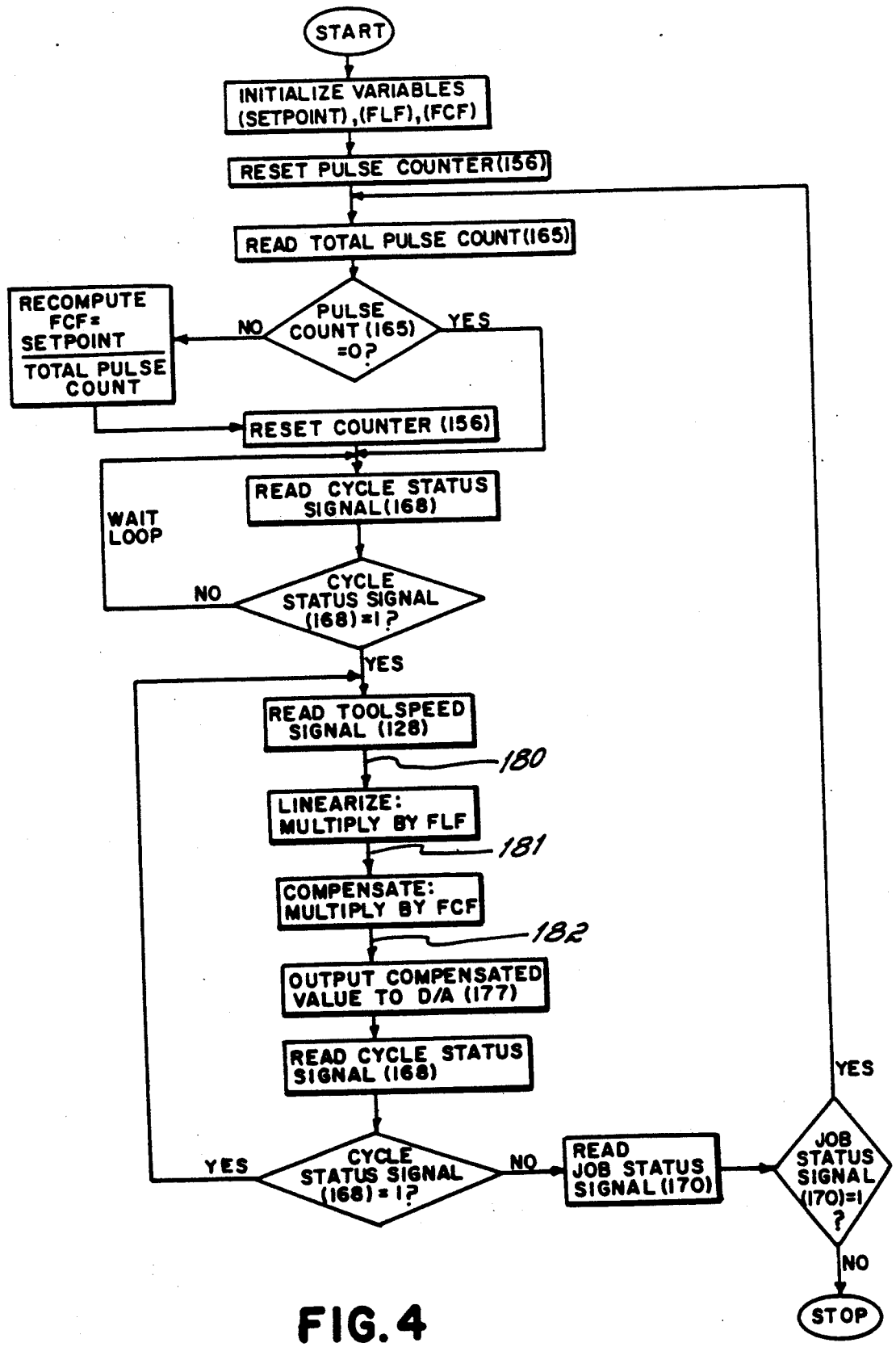
FIG. 4 is a flow chart illustrating the operation of the embodiment of FIG. 3.

FIG. 3 illustrates a second preferred embodiment of the invention which is similar to the embodiment described above except for the manner in which driving signal 122 is generated. As illustrated in FIG. 3, the system of FIG. 2 is modified by adding a positive displacement flow meter 150 to the fluid supply line connected to the inlet 28 of dispensing gun 10. While it is desirable to locate flow meter 150 as close to gun 10 as possible it is not required to be mounted with the gun 10 on the robot arm. Flow meter 150 includes an incremental encoder 152 which produces an electrical output signal 153 comprising a series of pulses 155. Each pulse 155 represents a predetermined volume of fluid. Signal 153 is input to a pulse counter 156 which counts pulses 155 and is resettable to zero by a reset signal 158 which is generated by a microprocessor based controller 160 which, if desired may be part of the robot controller (not shown). However, to provide maximum system frequency response, controller 160 should run at high speed and is preferably dedicated principally to performing the operations described below. In addition to a microprocessor and associated hardware, controller 160 includes all necessary program and data memory as well as an analog to digital converter (A/D) 163 which receives the toolspeed signal 128 from the robot controller. Pulse counter 156 outputs its pulse count 165 to controller 160. Controller 160 also receives from the robot controller (not shown), a digital cycle status signal 168 and a digital job status signal 170. Cycle status signal assumes a logical 1 value whenever dispensing gun 10 should be operating. Job status signal 170 assumes a logical 1 valve when a production run is at an end. Controller 160 also communicates by way of an interface 172 with an input/output device 175 such as a keyboard terminal from which control commands and setpoint data are entered. Controller 160 also communicates by way of an output 176 with a digital to analog D/A converter 177 which generates an analog signal 178. Signal 178 is received by amplifier 127 which operates as described above with reference to FIG. 2. Amplifier 127 in turn generates driving signal 122 which is applied to the plus input 119 of summing junction 113 as described above to generate error signal 130. The manner in which driving signal 122 is derived may be further understood with additional reference now to FIG. 4 which illustrates the software program stored in controller 160 responsible for outputting the required data to D/A converter 177.

The program begins running by clearing all data memory and initializing all variables including a setpoint representing a desired total volume of fluid to be applied to a single workpiece 39. An appropriate set of pre-programmed flow linearizing factors (FLFs) are also initialized at this point. The FLF's are constants which represent factors by which toolspeed signal 128 must be multiplied in order to linearize system flow response such that when a given percentage of the full scale value of toolspeed signal 128 is applied to summing junction 113, the needle valve 27 of metering valve assembly 26 is positioned so that the same percentage of the full scale flow of fluid is discharged from nozzle outlet 31. FLF's are determined empirically from a measured curve of actual flow from outlet 31 of nozzle 30 versus voltage applied at input 119 of summing junction 113. Since the actual flow curve may vary depending on the geometry of needle valve 27 and nozzle 29 including nozzle end 30 as well as the flow characteristics of the particular type of fluid being dispensed and the supply pressure, the program loads a series of FLF's appropriate to account for a particular set of these conditions.

The program also sets a flow compensation factor (FCF) to an arbitrarily selected initial value. The FCF is a variable which compensates for changes in the flow characteristics which occur over time such as changes in intrinsic viscosity due to changes in temperature or other factors as discussed earlier. The FCF is recomputed once each job cycle that is, once per dispensing operation on a given workpiece 39. The FCF is defined as a factor by which the linearized toolspeed signal must be multiplied so that the total volume of fluid dispensed onto a workpiece 39 is substantially equal to the selected setpoint. Deviation from setpoint cannot be determined at the beginning of the first job cycle because there is no basis for comparison. Accordingly, FCF is preferably initialized at unity. The manner in which FCF is recomputed will be described below.

During initialization, the program resets pulse counter 156 to zero by outputting an appropriate reset signal 158 from controller 160 to counter 158. Next, the program causes controller 160 to read the total pulse count 165. The value of pulse count 165 represents the total volume of fluid dispensed during the previous job cycle. If pulse count is not zero, as will be the case except prior to the first job cycle, the program recomputes the flow compensation factor FCF as a quotient whose dividend is equal to the setpoint and whose divisor is equal to total pulse count 165. After the FCF is recomputed counter 156 is again reset in the manner described above. If pulse count 165 is equal to zero, as it will be at the beginning of the first job cycle, the FCF remains at its initialized valve.

Next, the program enters a loop in which it waits for the robot controller signal that a job cycle is in progress. In the wait loop, the program continuously reads cycle status signal 168 and tests to determine whether it has assumed a logical 1 value. If not, the program stays in the loop. By changing status signal 168 from a logical zero value to a logical 1 value, the robot controller indicates that dispensing should commence. At that point, the program directs controller 160 to read the digital value 180 representing the magnitude of toolspeed signal 128 from the output of A/D converter 163. Based on the magnitude of the digital value, the program selects from a look-up table the corresponding flow linearizing factor FLF from the set of FLF values loaded during initialization. Digital value 180 is then multiplied by the selected FLF value to yield a linearized toolspeed value 181. To adjust driving signal 122 so that the actual volume of fluid to be dispensed during the job cycle conforms to the setpoint despite changes in the flow characteristics of the fluid, such as changes in viscosity, the program next causes the linearized toolspeed value 181 to be multiplied by the flow compensation factor FCF to yield a corrected digital value 182 which is then output to D/A converter 177 whose output 178 is fed to amplifier 127 to generate driving signal 122.

Next, the program again reads cycle status signal 168 to determine whether dispensing should continue. If not, job status signal 168 will not be a logical 1 value, indicating the present cycle has ended. In that case the program causes controller 160 to read job status signal 170 emanating from the robot controller. If job status signal 170 is not a logical 1 value, this indicates that the last workpiece 39 in a given production lot has been finished and the program is stopped. If the production run is not complete, job status signal 170 will remain at a logical 1 value and the program will loop back to the point at which pulse count 165 is read. Although the program described recomputes a flow compensation factor once per job cycle, it should be noted that such periodic adjustments can be made more or less frequently depending on how rapidly the flow characteristics of the dispensed fluid can be expected to undergo significant change.

The advantages realized by the invention are numerous. Most notably, the dispensing systems described provide rapid and precise control of fluid flow rate. Such systems have been found to have an upper 3 dB frequency response cutoff point exceeding 10 hertz.

While the dispensing gun 10 can be directed by any desired means including manually the invention is particularly well adapted for use with robots. Dispensing gun 10 is light weight, compact and easy to maintain. Further, the dispensing systems of the invention provide for automatic flow rate adjustment in accordance with the relative speed between the dispensing gun 10 on the robot arm and the workpiece.

Thus, the invention permits close control over the volume per unit length of the dispensed bead of fluid even during rapid acceleration and deceleration as normally occurs as the robot arm changes its direction of movement. The invention also provides means for periodically compensating for perturbations in the flow characteristic of the fluid being dispensed to insure that the volume of fluid dispensed always conforms closely with a desired setpoint.

While the above descriptions constitute preferred embodiments of the apparatus and method of the invention, it is to be understood that the invention is not limited thereby and that in light of the present disclosure of the invention various alternative embodiments will be apparent to persons skilled in the art. Accordingly, it is to be understood that changes can be made to the embodiments described without departing from the full legal scope of the invention which is particularly pointed out and distinctly claimed in the claims set forth below.

What is claimed is:

1. A method of dispensing fluid material, said method comprising the steps of:
   (a) delivering the fluid under pressure to a valve having a valve inlet and a valve outlet and conducting the fluid from said valve to a nozzle having a nozzle inlet and a nozzle outlet from which said fluid is dispensed, said valve outlet being coupled to said nozzle inlet, said valve outlet and said nozzle inlet being disposed in sufficiently close proximity to one another that very little fluid pressure drop occurs between said valve outlet and said nozzle inlet;
   (b) sensing, at a location between said valve outlet and said nozzle inlet a parameter other than the position of a flow restricting element, said parameter being correlated to the rate of flow of the fluid discharged from said nozzle outlet and generating a corresponding flow rate signal;
   (c) generating a control signal from at least said flow rate signal, and
   (d) operating said valve in accordance with said control signal to substantially infinitely variably modulate the flow of fluid dispensed from said nozzle outlet when said valve is at least partially open and to positively cut off flow when said valve is closed.

2. The method of claim 1 wherein said parameter is the pressure of the fluid at said location.

3. A method of dispensing fluid material onto a workpiece, said method comprising the steps of:
   (a) delivering the fluid under pressure to a valve having a valve inlet and a valve outlet and conducting the fluid from said valve to a nozzle having a nozzle inlet and a nozzle outlet from which said fluid is dispensed, said valve outlet being coupled to said nozzle inlet, said valve outlet and said nozzle inlet being disposed in sufficiently close proximity to one another that very little fluid pressure drop occurs between said valve outlet and said nozzle inlet;
   (b) sensing, at a location between said valve outlet and said nozzle inlet a parameter correlated to the rate of flow of the fluid discharged from said outlet and generating a corresponding flow rate signal;
   (c) generating a control signal from at least said flow rate signal and a signal correlated to the speed of relative movement between said nozzle outlet and the workpiece, and
   (d) operating said valve in accordance with said control signal to substantially infinitely variably modulate the flow of fluid dispensed from said nozzle outlet when said valve is at least partially open and to positively cut off flow when said valve is closed.

4. The method of claim 3 wherein said parameter is the pressure of the fluid.

5. The method of claim 4 further comprising the step of generating a pressure overrange signal in the event that said pressure exceeds a predetermined limit.

6. The method of claim 3 further comprising the step of linearizing said flow of the fluid with respect to said signal correlated to said speed of movement between the workpiece and said nozzle.

* * * * *

UNITED STATES PATENT AND TRADEMARK OFFICE
CERTIFICATE OF CORRECTION

PATENT NO. : 4,988,015

DATED : January 29, 1991

INVENTOR(S) : Richard P. Price

It is certified that error appears in the above-identified patent and that said Letters Patent is hereby corrected as shown below:

Col. 1, line 3, before the "Field of the Invention" insert --This is a division of application Serial No. 07/243,238, filed September 7, 1988, now U.S. Patent No. 4,922,852, which, in turn, is a file wrapper continuation of application Serial No. 06/924,940, filed October 23, 1986, now abandoned.--.

Col. 8, line 52, "needle valve 52" should be --needle valve 27--.

Col. 9, line 40, "valve" should be --value--.

Col. 10, line 30, "counter 158" should be --counter 156--.

Signed and Sealed this

Third Day of November, 1992

Attest:

DOUGLAS B. COMER

Attesting Officer

Acting Commissioner of Patents and Trademarks